Figure 1:
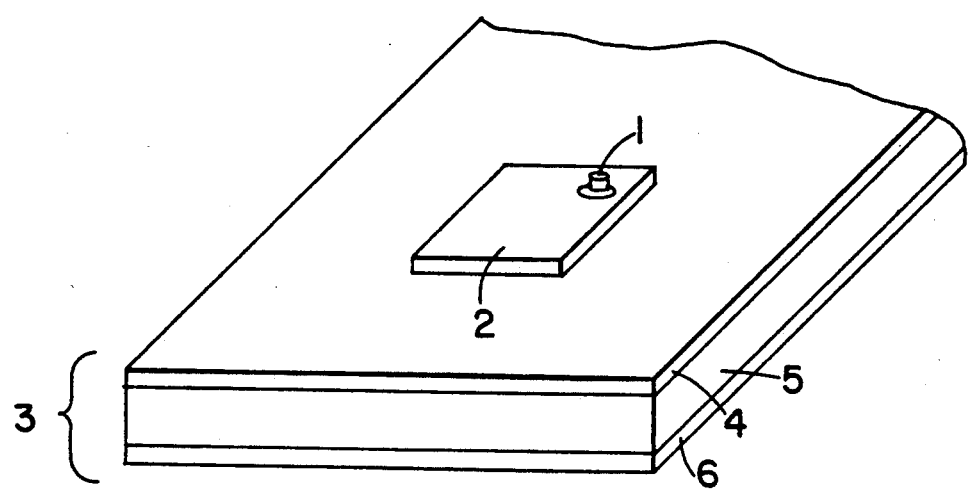

United States Patent [19]

De Gastines

[11] Patent Number: 5,014,390
[45] Date of Patent: May 14, 1991

[54] DEVICE FOR ATTACHING A FLEXIBLE COVERING ELEMENT SUCH AS A PIECE OF A CARPETING OR A MAT TO ITS SUPPORT

[75] Inventor: Gérard De Gastines, La Madeleine, France

[73] Assignee: Facam S.A., La Madeleine, France

[21] Appl. No.: 510,226

[22] Filed: Apr. 18, 1990

[30] Foreign Application Priority Data

Apr. 18, 1989 [FR] France .................. 89 05429

[51] Int. Cl.5 ............................. A47G 27/04
[52] U.S. Cl. .............................. 16/4; 16/8; 411/392
[58] Field of Search ............ 16/4, 8; 296/97.23; 411/392, 401, 408, 482, 446

[56] References Cited

U.S. PATENT DOCUMENTS

| 504,133 | 8/1893 | Parkinson | 411/482 |
| 3,290,983 | 12/1966 | Peterson | 411/446 |
| 4,762,453 | 8/1988 | Decaro | 411/392 X |
| 4,829,627 | 5/1989 | Altus et al. | 16/4 |
| 4,917,554 | 4/1990 | Bronn | 411/392 |

FOREIGN PATENT DOCUMENTS

| 0240836 | 10/1926 | United Kingdom | 16/4 |
| 0435580 | 9/1935 | United Kingdom | 16/8 |

Primary Examiner—Richard K. Seidel
Assistant Examiner—Patty E. Hong
Attorney, Agent, or Firm—Kerkam, Stowell, Kondracki & Clarke

[57] ABSTRACT

The invention pertains to a device for attaching a flexible covering element such as a piece of carpeting or a mat to its support characterized in that, to prevent loosening, the device comprises tooth-shaped protuberances under a collar such that the teeth are inclined so as to slide in the tightening direction on the upper face of the piece to which the collar is applied and which becomes anchored in the surface when loosening occurs.

5 Claims, 2 Drawing Sheets

DEVICE FOR ATTACHING A FLEXIBLE COVERING ELEMENT SUCH AS A PIECE OF A CARPETING OR A MAT TO ITS SUPPORT

The invention pertains to a device for attaching a flexible covering element such as a piece of carpeting or mat to its support.

More specifically but not exclusively, it applies to floor mats for automobiles.

In automobiles, the sheet metal forming the bottom of the body may or may not be lined with an undercarpet, then a covering made of rubber or carpeting, for example.

To prevent the covering from wearing, especially at the driver's seat, an additional mounted mat is commonly used, for example, also made of rubber or carpeting.

Said mat must in this case be attached to the floor at one or more points, if only to prevent it from interfering with the control of at least one of the pedals.

For this purose, at right angles with the points of attachment, it is a known procedure to pierce a small hole in the sheet metal and either to screw the foot of the attachment device therein, or, by elastic deformation, to engage into each of said holes the foot of an attachment device, which recovers its initial shape after having passed through the sheet metal, preventing it from being extracted.

The device generally comprises a collar such as a support washer on the floor and above the collar, shaped to allow a mat to be fastened to the device, directly (DE-A-1.455.856) or through the intermediary of an insert or a suplementary snap fastener (EP-A-20308 and GB-A-2.087.229).

In another embodiment (FR-A-1.405.310), the form allowing the mat to be fastened is presented by a block attached to the sheet metal by a screw passing through the hole in the sheet metal and screwing therein.

Even if the attachment of the mat is effective, the piercing of the sheet metal on the bottom of the body, which involves numerous problems such as rising moisture, constitutes a redhibitory defect and, especially, said holes cannot be made by the user.

Consequently, the attachment devices used to date comprise, under an upper part, itself being similar to that of the aforementioned devices, an attachment mechanism cooperating essentially with the mat and/or the undercarpet.

To this end, we know of a device endowed with a foot in the form of a wood screw (EP-A-58252) which creates its own hole by screwing into the support formed by the mat and/or the undercarpet in the same way as a simple screw of the known type for attaching a countersole to the first sole of a shoe (FR-A-933.199).

Nonetheless, this devices offers very limited resistance when stress is applied, especially pulling, as well as with vibrations due primarily to irregularities in the road, and very quickly loosens and releases the mat.

We also know (EP-A-211.960) of a device wherein, in place of a foot attached under the collar, the collar is made of thin sheet metal and is cut out to delimit two spiral sections therein, which are unfolded into helicoidal sections to allow the device to be screwed into the support.

In addition to the problem of quickly loosening, this device also presents the problem of tending to cut the fibers of the mat and/or undercarpet and to make two holes instead of one.

In a completely different field of application, namely that of means for anchoring or securing in unconsolidated soil, it is a known practice (GB-793.426) to use an attachment component such as a foot or ring connected by a rectilinear shaft to a foot having a long corkscrew shape.

Because it is screwed very deeply and, in this application, is not exposed to intense vibrations, this device does not tend to loosen, but, obviously, if the length of he corkscrew were comparable to the thickness of a mat with its undercarpet and if the device were exposed to vibrations, as designed, nothing would prevent said device from loosening.

One of the results the invention aims to obtain is an attachment device that effectively holds the flexible element on its support.

Another result of the invention is such a device producing a durable hold because it does not tend to loosen, even when exposed to intense vibrations.

A further result of the invention is a device that makes only a very small perforation in the mat and the support.

For this purpose, it has as an object an attachment device of the aforementioned type notably characterized in that, to prevent loosening, it comprises tooth-shaped protuberances under the collar and in that the teeth are inclined so as to slide in the tightening direction on the upper face of the piece to which the collar is applied and to become anchored in said face when loosening occurs.

Figure 2:
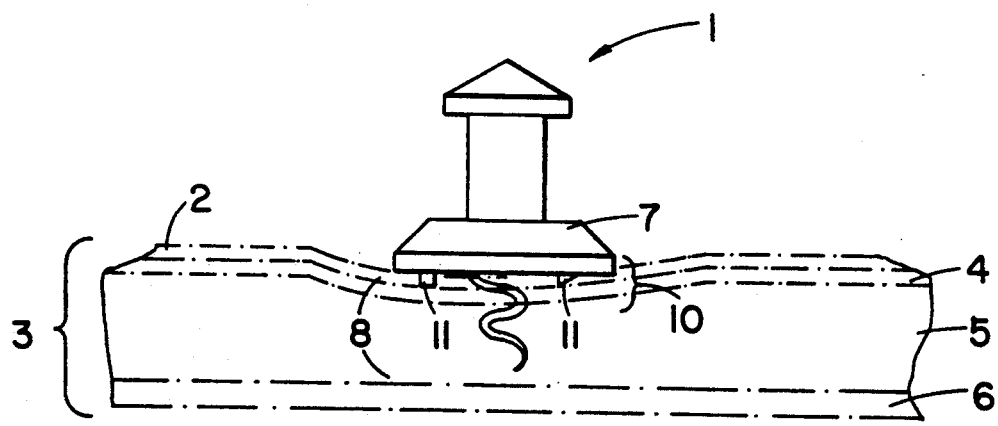
Figure 3:
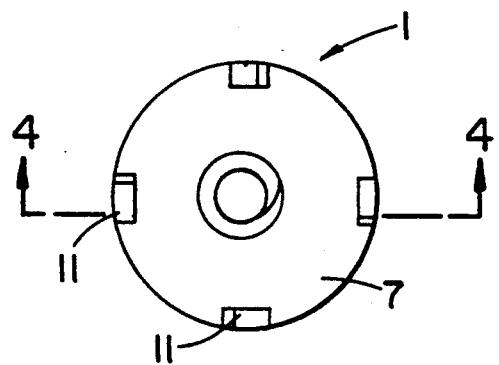
Figure 4:
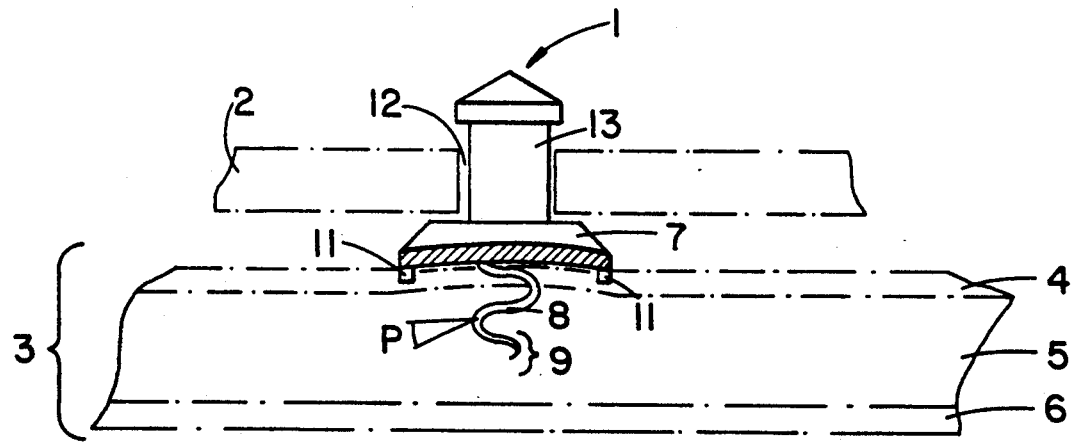

The invention will be clearly understood through the use of the description below provided as a non-restrictive example with regard to the attached drawing, which shows:

FIG. 1 a mat attached to its support;
FIG. 2 a front view of the device;
FIG. 3 a bottom view of the device;
FIG. 4 a cut along IV—IV of FIG. 3.

With reference to the drawing, we see that device 1 ensures the attachement of an additional mat 2 to a support 3 composed of a floor mat 4 and an undercarpet 5, all resting on sheet metal 6 composing, for example, the bottom of the body of an automobile.

Device 1 comprises a collar 7 under which is provided an anchoring mechanism 8 in support 3.

Said anchoring mechanism consists of a short corkscrew 8.

Slope P of the spiral of said corkscrew is selected to be small enough to prevent axial pressure applied to said spiral, by reaction, from generating its control in rotation.

Persons skilled in the art can determine the optimal slope according to the frictional forces of corkscrew 8 on the support material.

For example, for a corkscrew 8 having an outside diameter of approximately 8 millimeters, made of wire having a diameter of approximately two millimeters, a pitch of approximately six to seven millimeters yielded a satisfactory slope.

At free end 9 of the corkscrew (FIG. 4), the wire of the corkscrew is tapared to facilitate its penetration, but generally follows the same spiral.

To avoid enlarging the perforation of the support beyond the diameter of the spiral wire of the corkscrew and to ensure that the wire is fastened in the perforation, said end of the wire is thus not brought back towards the axis of the corkscrew.

At the opposite end 10 of corkscrew 8, i.e., the end turned towards collar 7 (FIG. 4), if the mounted mat is attached over the collar (FIG. 4), the wire also follows the same spiral until it penetrates collar 7.

To avoid promoting the relative rotation of mat 2 and device 1, said end 10 is thus not, at least in its apparent part, either pursued by an axial shaft or even brought back axially.

Said arrangement has another advantage of ensuring between collar 7 and spiral 8, considering the small slope of the spiral, the pinching then the wedging of the edge of mat 2 and/or the support in its part contiguous to the perforation, which also contributes to prevent the loosening of device 1.

When the mounted mat is attached under the collar (FIG. 2), end 10 of corkscrew 8 turned towards the collar is, on the contrary, brought back towards the axis of the corkscrew before penetrating collar 7 to allow mounted mat 2 to be pinched between collar 7 and support 3.

The mat to be attached can thus, indiscriminately:

Either be attached after being applied to the support (FIGS. 1 and 2); in this case, the corkscrew passes throught both mat 2 and support 3, and collar 7 pinches the entire unit;

Or the attached after the device is installed in support (FIG. 4); in this case, a hole 12 is placed in mounted mat 2, through which device 1 is threaded on a block 13 provided above the collar.

Also, to prevent loosening, device 1 comprises tooth-shaped protuberances 11 under collar 7 (FIG. 3), and said teeth are inclined so as to slide in the tightening direction on the upper face of the piece to which are collar is applied, depending on the method of assembly, and to become anchored in said face when loosening occurs.

What is claimed is:

1. Device for attaching a flexible covering element such as a piece of carpeting or a mat to a support composed of a floor mat and an undercarpet all supported by a sheet of metal, said device comprising a collar under which is provided an anchoring device in the support composed of a short corkscrew, said device being characterized in that, to prevent loosening, it comprises tooth-shaped protuberances under said collar and in that said protuberances are inclined so as to slide in the tightening direction on the upper face of the piece to which the collar is applied and to become anchored in said face when loosening occurs.

2. Device according to claim 1 wherein the slope of the spiral of corkscrew is selected to be small enough to prevent loosening from application of axial pressure to said spiral.

3. Device according to claim 1 wherein at the free end of the corkscrew, the wire of the corkscrew is tapered to facilitate its penetration but follows substantially the same spiral as said corkscrew.

4. Device according to claim 1 wherein the end of the corkscrew is turned towards the collar, the wire joins the axis and the end of the corkscrew turned towards the collar is brought back towards the axis of the corkscrew before penetrating said collar to allow the mat to be pinched between said collar and said support.

5. Device according to claim 1 wherein the end of the corkscrew turned towards the collar is brought back towards the axis of the corkscrew before penetrating said collar to allow the mat to be pinched between said collar and said support.

* * * * *